(12) United States Patent
Schuttenberg et al.

(10) Patent No.: US 9,304,777 B1
(45) Date of Patent: Apr. 5, 2016

(54) METHOD AND APPARATUS FOR DETERMINING RELATIVE AGES OF ENTRIES IN A QUEUE

(71) Applicant: Marvell International Ltd., Hamilton (BM)

(72) Inventors: Kim Schuttenberg, Gilbert, AZ (US); Sridharan Balasubramanian, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 381 days.

(21) Appl. No.: 14/029,594

(22) Filed: Sep. 17, 2013

Related U.S. Application Data

(60) Provisional application No. 61/702,432, filed on Sep. 18, 2012.

(51) Int. Cl.
   *G06F 9/38* (2006.01)

(52) U.S. Cl.
   CPC ............ *G06F 9/3855* (2013.01); *G06F 9/3836* (2013.01)

(58) Field of Classification Search
   CPC ... G06F 9/3836; G06F 9/3855; G06F 9/3824; G06F 9/3842; G06F 9/3863; G06F 9/3826
   See application file for complete search history.

(56) References Cited

U.S. PATENT DOCUMENTS 5,584,038 A * 12/1996 Papworth .................. G06F 5/14
                                                            711/110

\* cited by examiner

*Primary Examiner* — Farley Abad

(57) ABSTRACT

Some of the embodiments of the present disclosure provide a system comprising a queue configured to store a plurality of instructions, wherein the queue comprises a plurality of entries, wherein each entry of the plurality of entries of the queue is associated with a corresponding identification comprising a corresponding wrap bit and corresponding position bits; and a processing unit configured to receive (i) a first identification associated with a first entry storing a first instruction, and (ii) a second identification associated with a second entry storing a second instruction, compare (i) a first wrap bit of the first identification and (ii) a second wrap bit of the second identification, and determine a relative age of the first instruction with respect to the second instruction.

20 Claims, 9 Drawing Sheets

Time 1

| Position bits | Physical queue | Wrap bit |
|---|---|---|
| 3 | | |
| 2 | | |
| 1 | | |
| 0 | | |

Take->  Put ->

Virtual Extended queue

| 7 |
|---|
| 6 |
| 5 |
| 4 |
| 3 |
| 2 |
| 1 |
| 0 |

← Wrap line (at position 4)

Take->  Put ->

Fig. 2A

Time 2    Put A

| Position bits | Physical queue | Wrap bit |
|---|---|---|
| 3 | | |
| 2 | | |
| 1 (Put->) | | |
| 0 (Take->) | A | 0 |

Virtual Extended

| 7 |
|---|
| 6 |
| 5 |
| 4 |
| 3 |
| 2 |
| 1 | ← Put->
| 0 | A ← Take->

← Wrap line

Fig. 2B

| Time 3 | Put B, PutC | | | |
|---|---|---|---|---|
| | | Position bits | Physical queue | Wrap bit |
| | Put -> | 3 | | |
| | | 2 | C | 0 |
| | | 1 | B | 0 |
| Take-> | | 0 | A | 0 |

| | | | Virtual Extended | |
|---|---|---|---|---|
| | | 7 | | |
| | | 6 | | |
| | | 5 | | Wrap line |
| | | 4 | | |
| Put-> | | 3 | | |
| | | 2 | C | |
| | | 1 | B | |
| Take-> | | 0 | A | |

Fig. 2C

| Time 4 | Take A, Put D | | | |
|---|---|---|---|---|
| | | | Physical | Wrap |
| | | 3 | D | 0 |
| | | 2 | C | 0 |
| Take-> | | 1 | B | 0 |
| | Put -> | 0 | | |

| | | | Virtual Extended | |
|---|---|---|---|---|
| | | 7 | | |
| | | 6 | | |
| | | 5 | | Wrap line |
| Put-> | | 4 | | |
| | | 3 | D | |
| | | 2 | C | |
| Take -> | | 1 | B | |
| | | 0 | | |

Fig. 2D

| Time 7 | Put G | | | |
|---|---|---|---|---|
| | | Position bits | Physical queue | Wrap bit |
| Take-> | Put -> | 3 | D | 0 |
| | | 2 | G | 1 |
| | | 1 | F | 1 |
| | | 0 | E | 1 |

| | | Virtual Extended | |
|---|---|---|---|
| Put-> | 7 | | |
| | 6 | G | |
| | 5 | F | Wrap line |
| | 4 | E | |
| Take -> | 3 | D | |
| | 2 | | |
| | 1 | | |
| | 0 | | |

Fig. 2G

| Time 8 | Take D | | | |
|---|---|---|---|---|
| | | Position bits | Physical queue | Wrap bit |
| | Put -> | 3 | | |
| | | 2 | G | 1 |
| | | 1 | F | 1 |
| Take-> | | 0 | E | 1 |

| | | Virtual Extended | |
|---|---|---|---|
| Put-> | 7 | | |
| | 6 | G | |
| | 5 | F | Wrap line |
| Take -> | 4 | E | |
| | 3 | | |
| | 2 | | |
| | 1 | | |
| | 0 | | |

Fig. 2H

| Time 9 | Take E | | | |
|---|---|---|---|---|
| | | Position bits | Physical queue | Wrap bit |
| | Put -> | 3 | | |
| | | 2 | G | 1 |
| Take-> | | 1 | F | 1 |
| | | 0 | | |

| | | | Virtual Extended | |
|---|---|---|---|---|
| | Put -> | 7 | | |
| | | 6 | G | |
| Take -> | | 5 | F | Wrap line |
| | | 4 | | |
| | | 3 | | |
| | | 2 | | |
| | | 1 | | |
| | | 0 | | |

Fig. 2I

| Time 10 | Put H | | | |
|---|---|---|---|---|
| | | Position bits | Physical queue | Wrap bit |
| | | 3 | H | 1 |
| | | 2 | G | 1 |
| Take-> | | 1 | F | 1 |
| | Put -> | 0 | | |

| | | | Virtual Extended | |
|---|---|---|---|---|
| | | 7 | H | |
| | | 6 | G | |
| Take -> | | 5 | F | Wrap line |
| | | 4 | | |
| | | 3 | | |
| | | 2 | | |
| | | 1 | | |
| | Put-> | 0 | | |

Fig. 2J

Time 11 — Put I

| Position bits | Physical queue | Wrap bit |
|---|---|---|
| 3 | H | 1 |
| 2 | G | 1 |
| 1 | F | 1 |
| 0 | I | 0 |

Take-> Put-> (at position 1)

Virtual Extended:

| | | |
|---|---|---|
| 7 | H | |
| 6 | G | |
| 5 | F | ← Take -> |
| 4 | | Wrap line |
| 3 | | |
| 2 | | |
| 1 | | ← Put-> |
| 0 | I | |

Fig. 2K

Time 12 — Take F, Put J

| Position bits | Physical queue | Wrap bit |
|---|---|---|
| 3 | H | 1 |
| 2 | G | 1 |
| 1 | J | 0 |
| 0 | I | 0 |

Take-> (at 2), Put-> (at 1)

Virtual Extended:

| | | |
|---|---|---|
| 7 | H | |
| 6 | G | ← Take -> |
| 5 | | Wrap line |
| 4 | | |
| 3 | | |
| 2 | | ← Put-> |
| 1 | J | |
| 0 | I | |

Fig. 2L

METHOD AND APPARATUS FOR DETERMINING RELATIVE AGES OF ENTRIES IN A QUEUE

CROSS REFERENCE TO RELATED APPLICATIONS

This disclosure claims priority to U.S. Provisional Patent Application No. 61/702,432, filed on Sep. 18, 2012, which is incorporated herein by reference.

TECHNICAL FIELD

Embodiments of the present disclosure relate to a queue, and more particularly, to method and apparatus for determining relative ages of entries in a queue.

BACKGROUND

An out-of-order processor typically includes a re-order queue (ROQ) to permit instructions to be executed out of program order. A re-order queue is used to store instructions (or other information) that are to be executed later by a processing unit. Generally, a re-order queue is implemented using a circular buffer, with a take pointer and a put pointer keeping track of instructions that are taken out of the re-order queue and stored in the re-order queue, respectively. For proper execution of the instructions, the processing unit often needs to determine the relative ages of two instructions that are received from a re-order queue (for example, whether a first instruction entered the queue prior to, or subsequent to a second instruction). In a conventional system, the processing unit receives (e.g., from the re-order queue) a vector comprising a list, the list listing relative ages of all the instructions. However, generating, transmitting and/or processing such a list consumes extensive computational resources (e.g., needs additional wiring between the re-order queue and the execution unit, needs clock cycles to perform these operations, etc.). In another conventional system, the processing unit keeps track of movements of the take pointer and the put pointer of the queue, and/or keeps track of the instructions that are stored in and taken out of the queue, which also consumes extensive computational resources.

SUMMARY

In various embodiments, the present disclosure provides a system comprising a queue configured to store a plurality of instructions, wherein the queue comprises a plurality of entries, wherein the queue is associated with (i) a first pointer pointing to an entry of the queue that is configured to store an instruction that newly arrives in the queue and (ii) a second pointer pointing to an entry of the queue that stores an oldest instruction of the plurality of instructions, wherein each entry of the plurality of entries of the queue is associated with a corresponding identification, wherein each identification associated with each entry of the queue comprises (i) a wrap bit that is based on a position of the corresponding entry relative to one of the first pointer or the second pointer and (ii) position bits that are based on an absolute position of the corresponding entry relative to the plurality of entries of the queue; and a processing unit configured to receive, from the queue, (i) a first identification associated with a first entry of the plurality of entries, wherein the first entry stores a first instruction of the plurality of instructions, and (ii) a second identification associated with a second entry of the plurality of entries, wherein the second entry stores a second instruction of the plurality of instructions, compare (i) a first wrap bit of the first identification and (ii) a second wrap bit of the second identification, and based on comparing (i) the first wrap bit of the first identification and (ii) the second wrap bit of the second identification, determine a relative age of the first instruction with respect to the second instruction.

In various embodiments, the present disclosure provides a method comprising storing a plurality of instructions in a queue, wherein the queue comprises a plurality of entries, wherein the queue is associated with (i) a first pointer pointing to an entry of the queue that is configured to store an instruction that newly arrives in the queue and (ii) a second pointer pointing to an entry of the queue that stores an oldest instruction of the plurality of instructions, wherein each entry of the plurality of entries of the queue is associated with a corresponding identification, wherein each identification associated with each entry of the queue comprises (i) a wrap bit and (ii) position bits that are based on an absolute position of the corresponding entry relative to the plurality of entries of the queue; setting, for each identification associated with each entry of the queue, the corresponding wrap bit based on a position of the corresponding entry relative to one of the first pointer or the second pointer; receiving, from the queue, (i) a first identification associated with a first entry of the plurality of entries, wherein the first entry stores a first instruction of the plurality of instructions, and (ii) a second identification associated with a second entry of the plurality of entries, wherein the second entry stores a second instruction of the plurality of instructions; comparing (i) a first wrap bit of the first identification and (ii) a second wrap bit of the second identification; and based on comparing (i) the first wrap bit of the first identification and (ii) the second wrap bit of the second identification, determining a relative age of the first instruction with respect to the second instruction.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIGS. 2A-2L example operations of the re-order queue of FIG. 1, and a corresponding virtual extended queue.

DETAILED DESCRIPTION

Figure 1:
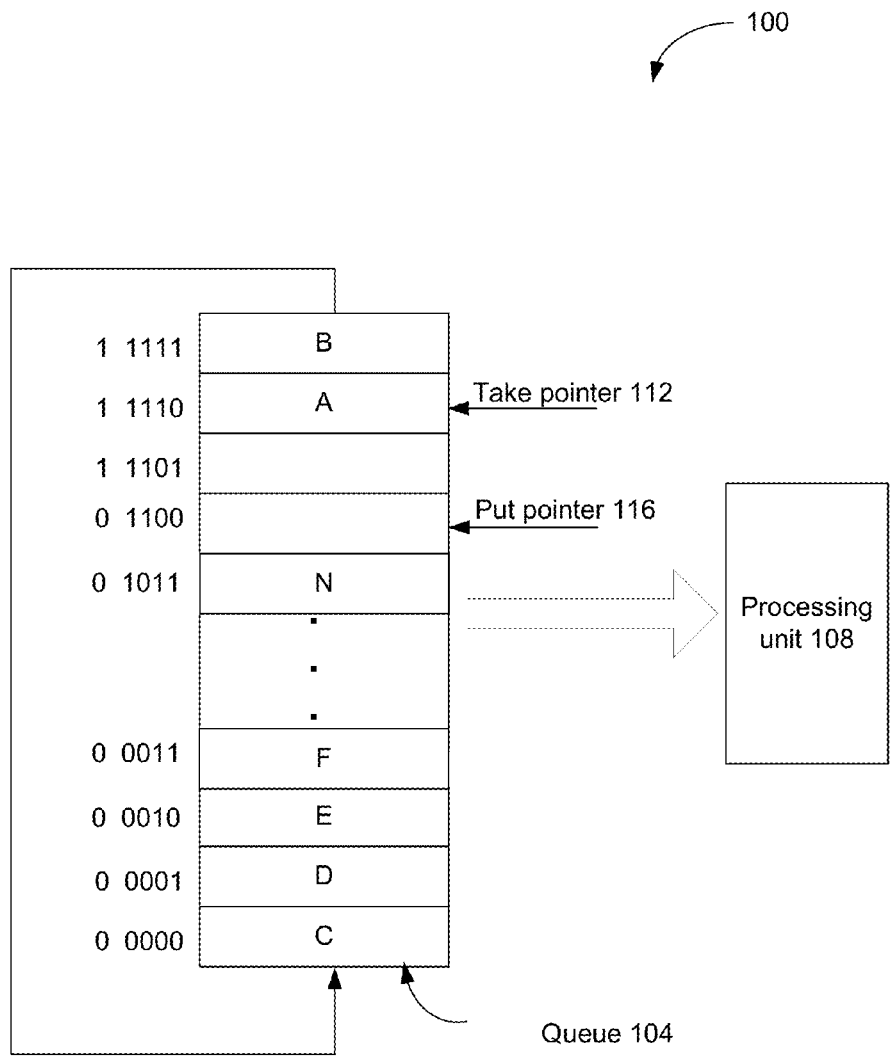
FIG. 1 schematically illustrates a system comprising a re-order queue and a processing unit.

FIG. 1 schematically illustrates a system 100 comprising a re-order queue 104 (referred to hereinafter as queue 104) and a processing unit 108. In an embodiment, the queue 104 queues a plurality of instructions. The plurality of instructions queued in the queue 104 is, for example, subsequently executed by the processing unit 108. In one example, the processing unit 108 receives instructions from the queue 104, and executes the received instructions. In an embodiment, the processing unit 108 determines the relative ages of instructions received from the queue 104 (for example, whether a first instruction entered the queue 104 prior to, or subsequent to a second instruction), as will be discussed in detail herein later. Although only one processing unit 108 is illustrated in FIG. 1, in an embodiment, more than one processing unit is present in the system 100, and more than one processing unit executes instructions received from the queue 104 and determines relative ages of the instructions.

The queue 104 comprises a plurality of entries, as illustrated in FIG. 1 (e.g., each rectangular box in the queue 104 of FIG. 1 illustrates an entry of the queue 104). In an embodiment, the queue 104 is a circular buffer configured to buffer the plurality of instructions. Each entry of the queue 104 is, for example, a buffer location that is configured to buffer a corresponding instruction. The instructions queued in the queue 104 are subsequently received and executed by the processing unit 108. In the example of FIG. 1, the queue 104 is illustrated to store instructions A, B, C, . . . , N. Furthermore, in FIG. 1, two entries of the queue (e.g., the entries between the entries storing instructions A and N) are blank, implying that these two entries are empty, do not store valid instructions, and/or the instructions stored in these two entries have been retired.

Although FIG. 1 illustrates the queue 104 storing instructions (e.g., storing instructions A, B, . . . , N), in another embodiment, the queue 104 may store only a part of the instructions or a record of the instructions (i.e., not store the actual or entire instructions). For example, although FIG. 1 illustrates an entry of the queue 104 storing instruction A, in another embodiment, the entry of the queue 104 may store only a part of the instruction A, a subset of information associated with the instruction A (e.g., a subset of the instruction A), a record or a pointer associated with the instruction A, or the like. Unless otherwise stated, the remaining part of this disclosure assumes the entries of the queue 104 storing corresponding instructions—however, the teachings of this disclosure also applies to embodiments where each entry of the queue 104 stores only a part of a corresponding instruction, a subset of information associated with the corresponding instruction (e.g., a subset of the corresponding instruction), a record or a pointer associated with the corresponding instruction, and/or the like.

In an embodiment, instructions are stored in the queue 104 in an order in which the instructions are received, as will be discussed in more detail herein later. Furthermore, if a first instruction is stored in the queue 104 prior to storing a second instruction in the queue 104, then the first instruction is termed to be an older (or a previous) instruction compared to the second instruction, and the second instruction is termed to be a newer (or a younger or subsequent) instruction compared to the first instruction.

In an embodiment, the queue 104 is associated with two pointers—a put pointer 116 and a take pointer 112, which will be discussed in detail herein later. Furthermore, in an embodiment, each entry of the queue 104 is associated with an identification (ID). For example, the queue 104 of FIG. 1 is illustrated to include sixteen entries (although the queue 104 may include any different number of entries), and the ID of an entry is illustrated in the left side of the entry.

In an embodiment, an ID associated with an entry of the queue 104 comprises a (i) first bit that is based on a position of the corresponding entry relative to one or both of the take pointer 112 or the put pointer 116 and (ii) one or more second bits that are based on an absolute position of the corresponding entry relative to the entries of the queue. In an embodiment, the first bit of an ID is also referred to as a wrap bit, and the one or more second bits of the ID are also referred to as position bits. Thus, each ID of the queue 104 has a wrap bit and position bits. In FIG. 1, for each ID, the corresponding wrap bit is separated by a space from the corresponding position bits for purposes of illustrative clarity. In an embodiment, an ID of an entry of the queue 104 is stored in an appropriate memory location (e.g., in the corresponding entry of the queue 104, in a memory that is coupled to the queue 104 and/or the processing unit 108, one or more registers associated with the system 100, and/or the like). In an embodiment, each entry of the queue 104 stores the corresponding ID, along with storing a corresponding instruction. The position bits of the entries does not change, irrespective of the manner in which instructions are stored in the queue 104 (while, for example, the wrap bits of the entries may change, based on the manner in which instructions are stored in the queue 104). Accordingly, in another embodiment, the position bits of various entries of the queue 104 can be easily or trivially derived (e.g., based on the relative positions of various entries in the queue 104). Accordingly, in such an embodiment, the entries of the queue 104 does not store the position bits (e.g., the processing unit 108 can derive the position bits of the entries on the fly or in some other manner), but the entries of the queue 104 store the corresponding wrap bits.

In an example, as illustrated in FIG. 1, all entries that are in one side (e.g., top side) of the put pointer 116 have a value of 1 for the wrap bit of the corresponding IDs, and all entries that are in another side (e.g., bottom side) of the put pointer 116 have a value of zero for the wrap bit of the corresponding IDs. In an embodiment and although not illustrated in FIG. 1, the wrap bit for entries of the queue that are not occupied have a don't care condition or are irrelevant.

Also, for each entry, the position bits of the ID refer to an absolute position of the entry relative to the entries of the queue. For example, the position bits of the ID of a first entry of the queue 104 is 0000, the position bits of the ID of a second entry of the queue 104 is 0001, the position bits of the ID of a third entry of the queue 104 is 0010, and so on, as illustrated in FIG. 1.

In an embodiment, the put pointer 116 refers or points to an entry of the queue 104 where a newly received instruction is to be stored. For example, if a new instruction is received by the queue 104, the new instruction is stored in the entry that is pointed to by the put pointer 116, and the put pointer 116 is incremented to point to the next entry in the queue 104. For example, in FIG. 1, the put pointer 116 refers or points to an entry with the ID having the position bit 1100. So, if a new instruction is received, the new instruction will be stored in the entry with the position bit 1100, and the put pointer 116 will be incremented such that the put pointer 116 now refers to the entry with the position bit 1101. Based on the movement of the put pointer 116, the wrap bit of the entry with the position bit 1100 will also change. For example, the wrap bit of the entry with the position bit 1100 will change from 0 to 1, such that the ID of the entry becomes 11100.

The take pointer 112 refers or points to an entry of the queue from where an old instruction is to be retired from the queue 104. Retiring an instruction may be performed, for example, by marking the instruction as invalid, overwriting the instruction with another instruction, deleting the instruction from the queue 104, or the like. In an embodiment, the queue 104 is configured to act as a first-in first-out (FIFO) buffer, and the take pointer 112 points to an oldest instruction stored in the queue 104. If the queue 104 is to retire an instruction, the oldest instruction pointed to by the take pointer 112 is retired from the queue 104, and the take pointer 112 is incremented or moved to point to the next oldest instruction in the queue 104. For example, the take pointer 112 in FIG. 1 refers to the entry with ID 11110 storing instruction A. If the queue 104 is to retire an instruction, the instruction A will be retired from the queue 104 (e.g., as the instruction A is the oldest instruction in the queue 104), the take pointer 112 will be incremented such that the take pointer 112 points to the entry with the ID 11111.

Although FIG. 1 illustrates the wrap bits of the IDs of the entries of the queue 104 being based on the put pointer 116, in an embodiment, the wrap bits may also be based on the take pointer 112. Furthermore, although FIG. 1 illustrates each of the wrap bits of the entries, which are above the put pointer 116, set to 1, the converse is also possible, as will be discussed in detail herein later.

When the processing unit 108 receives and executes various instructions from the queue 104, the processing unit 108 may need to know the relative ages of the instructions (e.g., whether a first instruction is newer or older than a second instruction). The processing unit 108 receives an instruction and the ID associated with the instruction (i.e., the wrap bit and the position bits associated with the instruction) from the queue 104, based on which the processing unit 108 determines the relative ages of the instructions.

In an embodiment, whether a first instruction is newer or older than a second instruction cannot be ascertained solely from the position bits of the entry of the queue 104 in which the instruction is stored. For example, referring to FIG. 1, position bits (1011) associated with the instruction N is higher compared to the position bits associated with instructions C, D, E and F, and the instruction N is newer compared to the instructions C, D, F and F. On the other hand, position bits (1011) associated with the instruction N are lower compared to the position bits associated with instructions A and B, and the instruction N is newer compared to the instructions A and B. Thus, whether the instruction N is newer or older than another instructions in the queue 104 cannot be ascertained solely from the position bits associated with the instructions. In an embodiment, the wrap bits of various entries of the queue 104, in conjunction with the corresponding position bits, are used to determine relative ages of the instructions, as will be discussed in more detail herein later.

As discussed, each entry of the queue 104 has corresponding position bits that are constant (i.e., do not change with the movement of the take pointer 112 or the put pointer 116). Also, each entry of the queue 104 has a corresponding wrap bit that may change with the movement of the take pointer 112 and/or the put pointer 116. Thus, each entry of the queue can have two potential IDs—one with a wrap bit of 0, and another with a wrap bit of 1. For example, the topmost entry of the queue 104 (e.g., the one that is occupied by instruction B in FIG. 1) can have two IDs—one being 01111 and the other being 11111. Thus, although the physical queue 104 of FIG. 1 has only 16 entries, the address-space or the name-space of the queue 104 can have 32 potential entries (wherein the name-space of the queue 104 comprises all possible IDs of each entry of the queue 104). Thus, the physical queue 104 can be extended to create a corresponding virtual extended queue (wherein the corresponding virtual extended queue comprises the name-space of the queue 104) that is twice the size of the physical queue 104. For example, if the physical queue 104 has Y1 entries, the virtual extended queue will have 2 times Y1 entries. The virtual extended queue, albeit having twice the size of the physical queue 104, can have a maximum of Y1 entries that are occupied at any given time (i.e., a number of occupied entries in the virtual extended queue will be equal to a number of occupied entries in the physical queue 104).

As previously discussed, in one example, the processing unit 108 receives instructions from the queue 104, and executes the received instructions. In another example, the processing unit 108 (i) receives instructions from a source that is different from the queue 104, and/or (ii) receives the IDs associated with various entries of the queue 104 from the queue 104 or from a source that is different from the queue 104.

FIGS. 2A-2L example operations of the queue 104 of FIG. 1, and the corresponding virtual extended queue. In FIGS. 2A-2L, the physical queue 104 is assumed to have 4 entries only for the sake of simpler explanation (i.e., the virtual extended queue will have 8 entries, with a maximum of 4 entries occupied at any given time), although the queue 104 may have any different number of entries. The entries of the virtual extended queue is labeled as 0, . . . , 7.

Figure 2E:
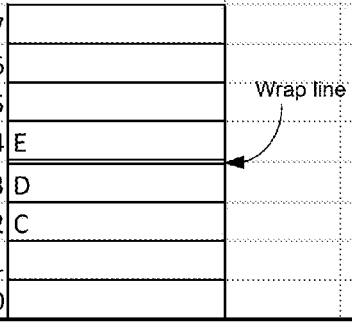
Figure 2F:
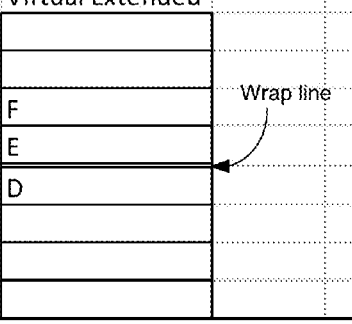

Furthermore, in each of FIGS. 2A-2L, the time (or the corresponding clock cycle) varies. For example, FIG. 2A is a snapshot of the queue 104 at time 1 (which, for example, corresponds to a $1^{st}$ clock cycle); FIG. 2B is a snapshot of the queue 104 at time 2 (which, for example, corresponds to a $2^{nd}$ clock cycle); FIG. 2C is a snapshot of the queue 104 at time 3 (which, for example, corresponds to a $3^{rd}$ clock cycle), and so on.

Furthermore, each of FIGS. 2A-2L illustrates the position bits of each entry of the queue 104. Furthermore, each of FIGS. 2A-2L illustrates the wrap bits of only those entries of the queue 104 that are occupied (wrap bits of unoccupied entries of the queue 104 are irrelevant, and hence, are not illustrated in the figures). Furthermore, in each of FIG. 2A-2L, the corresponding virtual extended queue is illustrated to have a wrap line, which is a mapping of two ends of the physical queue 104 to the virtual extended queue.

As will be discussed in more detail herein later, for each entry that is on one side of the wrap line in the virtual extended queue, the corresponding wrap bit in the physical queue 104 is 0; and for each entry that is on another side of the wrap line in the virtual extended queue, the corresponding wrap bit in the physical queue 104 is 1.

Also, the take pointer 112 and the put pointer 116 are illustrated in each of FIGS. 2A-2L. For purposes of illustrative clarity, the take pointer 112 and the put pointer 116 are respectively labeled as take and put in the figures and illustrated using simple arrows.

Referring to FIG. 2A, at time 1 (e.g., during a first clock cycle), the queue 104 is empty. Hence, the wrap bits of the physical queue 104 are not illustrated in FIG. 2A. Furthermore, as the queue 104 is empty, both the take pointer 112 and the put pointer 116 point to the same entry of the queue 104 (i.e., point to the entry with position bit 0). Also, as the queue 104 is empty, the corresponding virtual extended queue is also empty.

Referring to FIG. 2B, at time 2 (e.g., during a second clock cycle that is subsequent to the first clock cycle of FIG. 2A), "put A" is being executed on the queue 104, where put A implies storing of instruction A in the queue 104. As the put pointer in FIG. 2A pointed to the entry with position bit 0, the instruction A in FIG. 2B is stored in the entry with position bit 0, and the put pointer 116 is incremented to now point to the entry with position bit 1 in FIG. 2B. Also, in response to the storage of the instruction A, the wrap bit of the entry storing instruction A is set to 0. FIG. 2B also illustrates the corresponding change in the virtual extended queue, in which the instruction A is stored in position 0.

Referring to FIG. 2C, at time 3 (e.g., during a third clock cycle that is subsequent to the second clock cycle of FIG. 2B), "put B, put C" are being executed on the queue 104, which implies storing of instructions B and C in the queue 104. As the put pointer in FIG. 2B pointed to the entry with position bit 1, the instructions B and C in FIG. 2C are stored in the entries with position bits 1 and 2, respectively, and the put pointer 116 is incremented to now point to the entry with position bit 3 in FIG. 2C. Also, in response to the storage of the instructions B and C, the wrap bit of the entries storing instructions B and C are also set to 0. FIG. 2C also illustrates the corresponding change in the virtual extended queue, in which the instructions B and C are stored in positions 1 and 2 of the virtual extended queue.

Referring to FIG. 2D, at time 4 (e.g., during a fourth clock cycle that is subsequent to the third clock cycle of FIG. 2C), "take A, put D" are being executed on the queue 104, which implies taking out instruction A (i.e., retiring instruction A) from the queue 104 and storing instruction D in the queue 104. Thus, instruction A is retired from the queue 104 (and the wrap bit for the position 0 in the queue 104 becomes irrelevant) and the take pointer 112 is incremented to now point to the entry with position bit 1. Also, the instruction D in FIG. 2D is stored in the entry with position bit 3, and the put pointer 116 is wrapped around the queue 104 (e.g., as the queue 104 is a circular buffer) to now point to the entry with position bit 0 in FIG. 2D. Also, in response to the storage of the instruction D, the wrap bit of the entry storing instruction D is also set to 0. FIG. 2C also illustrates the corresponding change in the virtual extended queue.

In FIGS. 2A-2C, the put pointer 116 moved through all the entries of the queue 104 (e.g., starting from the position bit 0 and ending in the position bit 3), and the wrap bits of all the new entries of the queue during this iteration or movement of the put pointer 116 in FIGS. 2A-2C were set to 0. From FIG. 2D, the put pointer starts afresh from position 0, i.e., is ready to perform a second iteration or movement through all the entries of the queue 104. During this iteration and as is illustrated in subsequent FIGS. 2E-2I, the wrap bits of all the new entries of the queue 104 will be set to 1. Similarly, during a third iteration of the put pointer 116 (e.g., as illustrated in FIGS. 2K-2L), the wrap bits of all the new entries of the queue 104 will be set to 0, and so on. Thus, the wrap bits alternate between 0 s and 1 s during each iteration of the put pointer 116.

Referring again to FIG. 2E, at time 5 (e.g., during a fifth clock cycle that is subsequent to the fourth clock cycle of FIG. 2D), "take B, put E" are being executed on the queue 104, which implies taking out instruction B (i.e., retiring instruction B) from the queue 104 and storing instruction E in the queue 104. Thus, instruction B is retired from the queue 104 (and the wrap bit for the position 1 in the queue 104 becomes irrelevant) and the take pointer 112 is incremented to now point to the entry with position bit 2. Also, the instruction E in FIG. 2E is stored in the entry with position bit 0, and the put pointer 116 is incremented to now point to the entry with position bit 1 in FIG. 2E. Also, in response to the storage of the instruction E during the second iteration of the put pointer 116, the wrap bit of the entry storing instruction E is set to 1. FIG. 2E also illustrates the corresponding change in the virtual extended queue. As the wrap bit of the entry storing instruction E is set to 1, the instruction E is stored above the wrap line in the virtual extended queue. Each entry below the wrap line in the virtual extended queue has a corresponding wrap bit of 0 (or has a wrap bit that is irrelevant, as the entry may be empty); and the entries above the wrap line in the virtual extended queue has a corresponding wrap bit of 1 (or has wrap bit that is irrelevant, as the entry may be empty).

Similar to FIGS. 2A-2E, in FIGS. 2F-2L, various instructions are stored in and/or retired from the queue 104. For purposes of brevity, a detailed explanation of the queue operations depicted in FIGS. 2F-2L is omitted herein, as such operations are evident from the discussion of FIGS. 2A-2E.

Referring to, for example, FIGS. 2E and 2L, in both of these figures, the put pointer 116 and the take pointer 112 are pointing to the same entries in the physical queue 104 (i.e., the put pointer 116 and the take pointer 112 are pointing to the entries with position bits 1 and 2, respectively, in the physical queue 104). However, in these two figures, the wrap bits of the entries are different. Accordingly, the virtual extended queue is also different for FIGS. 2E and 2L. That is, for the same position of the put pointer 116 and the take pointer 112, the IDs of the entries can be different (e.g., as illustrated in FIGS. 2E and 2L).

As previously discussed, the wrap bit of the queue 104 results in an extension of a name-space of the queue 104. For example, the virtual extended queue (which is a representation of the name-space of the queue 104) has twice the number of entries than the physical space of the queue 104. This creates a contiguous space in the virtual extended queue, with only a contiguous set of entries representing actual instructions that are stored in the physical queue 104. Also, at most only half of the virtual extended queue can be used at any time. For example, each entry of the physical queue 104 can potentially be mapped to one of two entries of the virtual extended queue, based on the wrap bit of the entry. For example, in response to the wrap bit of an entry of the physical queue 104 being 0, the entry of the physical queue 104 is mapped to a first entry of the virtual extended queue; and in response to the wrap bit of the entry of the physical queue 104 being 1, the entry of the physical queue 104 is mapped to a second entry of the virtual extended queue. For example, in FIG. 2E, for the entry of the physical queue 104 with the position bit of 0, the wrap bit is 1, and the entry of the physical queue 104 is mapped to an entry 4 of the virtual extended queue; and in FIG. 2L, for the entry of the physical queue 104 with the position bit of 0, the wrap bit is 0, and the entry of the physical queue 104 is mapped to an entry 0 of the virtual extended queue.

As the instructions stored in the virtual extended queue occupy contiguous entries (e.g., in the manner of a circular FIFO buffer) and the number of invalid entries in the virtual extended queue are greater than or equal to half of the name-space, the relative ages of the instructions stored in the queue 104 are, for example, determined by a comparison of the IDs of any two valid entries. For example, if a distance between the IDs of two instructions is less than an amount of actual reordering storage, the entry with the lower numbered name is the older instruction. On the other hand, if the difference is greater than the amount of storage, the result is inverted.

This can be expressed in the following equation for an N-bit ID representing $2^{(N-1)}$ queue locations. Assume that ID[N] represents a most-significant bit of an ID (i.e., the wrap bit of the ID), ID[0] represents a least significant of the ID, and ID[X:Y] represents a concatenation of all of the bits of ID between bits X and Y. Also, assume an ID of an instruction A stored in the queue is IDA, and an ID of an instruction B stored in the queue is IDB.

The instruction A is older than instruction B (i.e., stored the queue 104 prior to the storage of the instruction B) if $(IDA[N] \text{ XOR } IDB[N]) \text{ XOR } (IDA[N-1:0] < IDB[N-1:0])$ is equal to 1   Equation 1

In Equation 1, IDA[N] and IDB[N] respectively represent the wrap bits of the IDs of instructions A and B; and IDA[N−1:0] and IDB[N−1:0] respectively represent the position bits of the IDs of instructions A and B. Equation 1 compares the wrap bits of the IDs of instructions A and B. If the wrap bits of the IDs of instructions A and B are the same (e.g., if both are 0), then instruction A is older than instruction B if the position bits of the ID of instruction A are smaller than the position bits of the ID of instruction B. For example, as illustrated in FIG. 2C, the wrap bits of the IDs of instructions A and B are the same (e.g., both are 0), and the position bits of the ID of instruction A is smaller than the position bits of the ID of instruction B—accordingly, instruction A is older than instruction B. On the other hand, if the wrap bits of the IDs of instructions A and B are different, then instruction A is older than instruction B if the position bits of the ID of instruction A are higher than the position bits of the ID of instruction B. For example, as illustrated in FIG. 2E, the wrap bits of the IDs of instructions D and E are different, and the position bits of the ID of instruction D is higher than the position bits of the ID of instruction E—accordingly, instruction D is older than instruction E.

Equation 1 allows the relative ages of the instructions A and B to be determined based solely on comparing the IDs of the two instructions. Furthermore, determining the relative ages of the instructions A and B does not require knowledge of any of the put pointer 116 or the take pointer 112. In contrast, in a conventional queue (e.g., one that does not have a wrap bit), relative ages of the instructions are determined based on a list listing relative ages of all the instructions, tracking the movements of the take pointer and the put pointer of the queue, and/or tracking of the instructions that are stored in and taken out of the queue, which consumes extensive computational resources.

In an embodiment, the processing unit 108 of FIG. 1 receives a plurality of instructions from the queue 104, along with the IDs of the entries in which the instructions are stored in the queue 104. The processing unit 108 determines relative ages of the instructions based on, for example, the wrap bits of the associated IDs (e.g., using Equation 1). Determination of the relative ages of the instructions (e.g., by the processing unit 108) enables the processing unit 108 to correctly process the instructions (e.g., process the instructions in a correct order, re-order the results of the processed instructions, and/or the like).

In an example, the processing unit 108 identifies a specific instruction, and performs a specific operation (e.g., performs a poisoning or invalidation operation, performs a grant operation, and/or the like) on all instructions that are, for example, younger than the identified specific instruction (or older than the identified instruction). In such a case, the processing unit 108 identifies all instructions that are younger than the identified specific instruction (or are older than the identified specific instruction). The processing unit 108, for example, identifies all instructions that are younger than the identified specific instruction (or older than the identified specific instruction) by, for example, comparing the IDs of all the instructions with the ID of the identified specific instructions (e.g., using Equation 1).

In the examples of FIGS. 1 and 2A-2L, each entry of the queue 104 was assumed to have a single wrap bit, which resulted in the virtual extended queue having twice the number of entries compared to that of the queue 104 (i.e., the name-space of the queue 104 doubled). In an embodiment, each entry of the queue 104 may have more than a single wrap bit. In an example, the wrap bit of each entry of the queue 104 comprises two bits. In such a case, the virtual extended queue has even higher number of entries (e.g., more than twice the number of entries compared to that of the queue 104).

In an embodiment, the wrap bits of an entry comprise, for example, 2 bits. Merely as an example, a wrap bit of value 00 and 11 indicates a relative position of the corresponding entry relative to the put pointer 116 and/or the take pointer 112. Also, a wrap bit of value 01 may indicate that the instruction has already been retired in the queue, but is still being processed in a pipeline (e.g., processed by the processing unit 108). For example, during a take operation, the wrap bit of the ID of an instruction is changed to 01 (e.g., indicating that the instruction has retired), and the entry in the physical queue 104 is reused to store other newer instructions. The extended virtual queue may still have an entry for the instruction, with the wrap bit of 01. In another example, prior to an instruction being queued in the queue, the instruction is assigned an ID with a wrap bit of, for example, 10 (and assigned position bits of the entry in which the instruction will be eventually stored). Thus, although instructions with wrap bit of 10 are not physically stored in the queue 104, they are assigned an entry in the extended virtual queue. Thus, each entry of the queue 104 can be potentially associated with four entries of the extended virtual queue (i.e., have one or more of wrap bits 00, 01, 10, and 11). In another example, when an instruction retires from the queue 104, the corresponding wrap bit does not change—rather, the wrap bit of the retired instruction is merely no longer stored in the queue 104.

Figure 3:
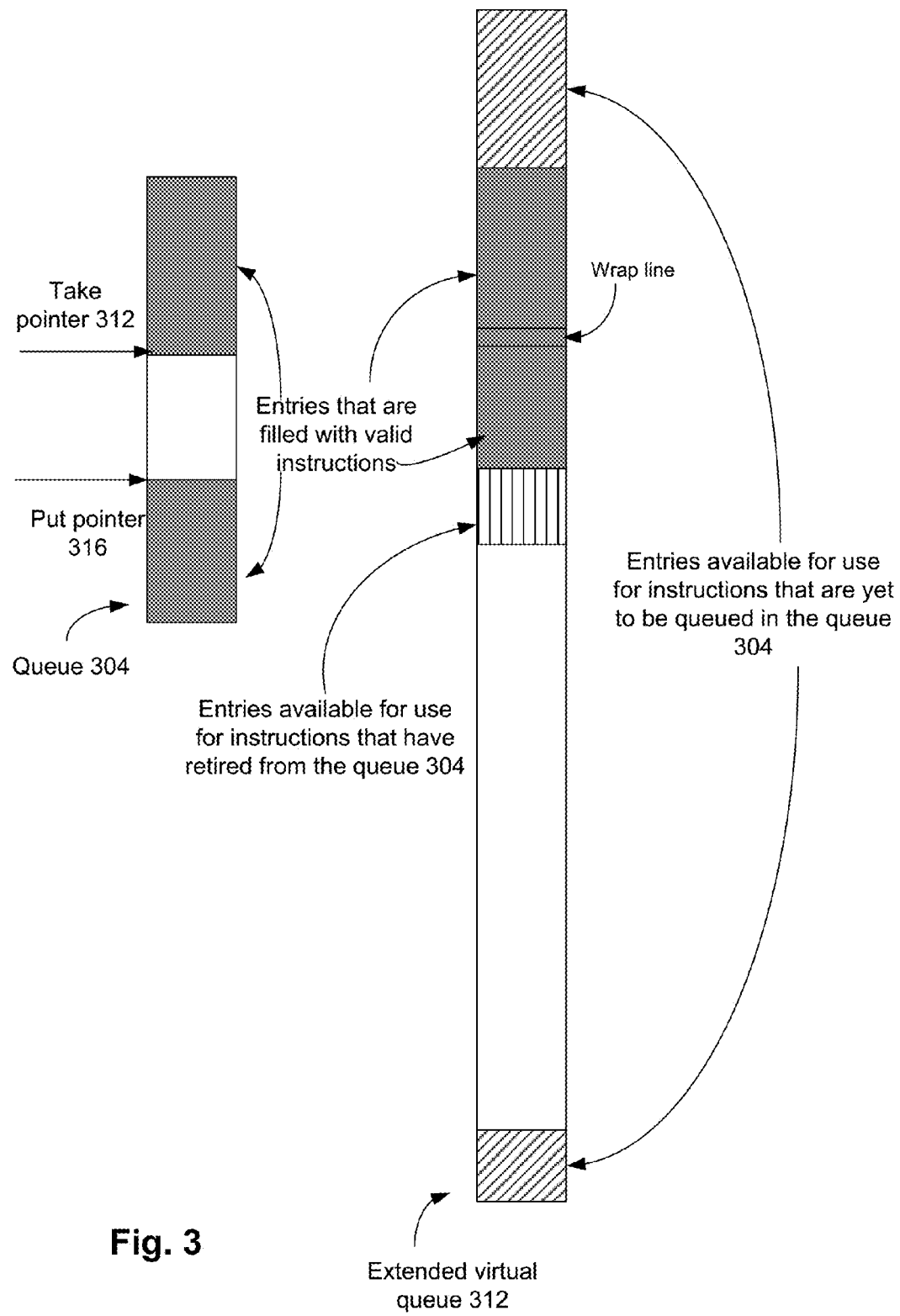
FIG. 3 illustrates a queue being mapped to an extended virtual queue, wherein wrap bits of each entry of the queue has 2 bits.

FIG. 3 illustrates a queue 304 being mapped to an extended virtual queue 312, wherein each entry of the queue 304 has 2 wrap bits. Other than the wrap bits comprising 2 bits, the queue 304 of FIG. 3 is similar to the queue 104 of FIG. 1. FIG. 3 also illustrates a put pointer 312 and a take pointer 316 (e.g., which are similar to the put pointer 116 and the take pointer 112 of FIG. 1). The grey area of the queue 304 and the extended virtual queue 312 represents those entries that are filled (e.g., occupied by valid instructions). The extended virtual queue 312 also includes sections labeled using diagonal lines, which, for example, represent entries available for use for instructions that are yet to be queued in the queue 304. The extended virtual queue 312 also includes a section labeled using vertical lines, which, for example, represents entries available for use for instructions that have retired from the queue 304. The extended virtual queue 312 also includes a section labeled using white space, which, for example, represents entries that do not store any valid instructions. The entries labeled using the white space, for example, has to be at least as large as half the name-space of the queue (i.e., at least as large as half the number of entries of the extended virtual queue 312) in order to efficiently determine relative ages of the instruction (e.g., using Equation 1). As previously discussed, in an example, when an instruction retires from the queue 304, the corresponding wrap bit does not change—rather, the wrap bit of the retired instruction is merely no longer stored in the queue 304

Although this disclosure is directed to a queue storing instructions and determining relative ages of the instructions, the principles of this disclosure can be applied to a queue storing any other information. For example, the principles of this disclosure can be applied to a queue storing packets received over a network, and determining relative ages of the instructions, as will be readily understood by those skilled in the art based on the teachings of this disclosure.

Figure 4:
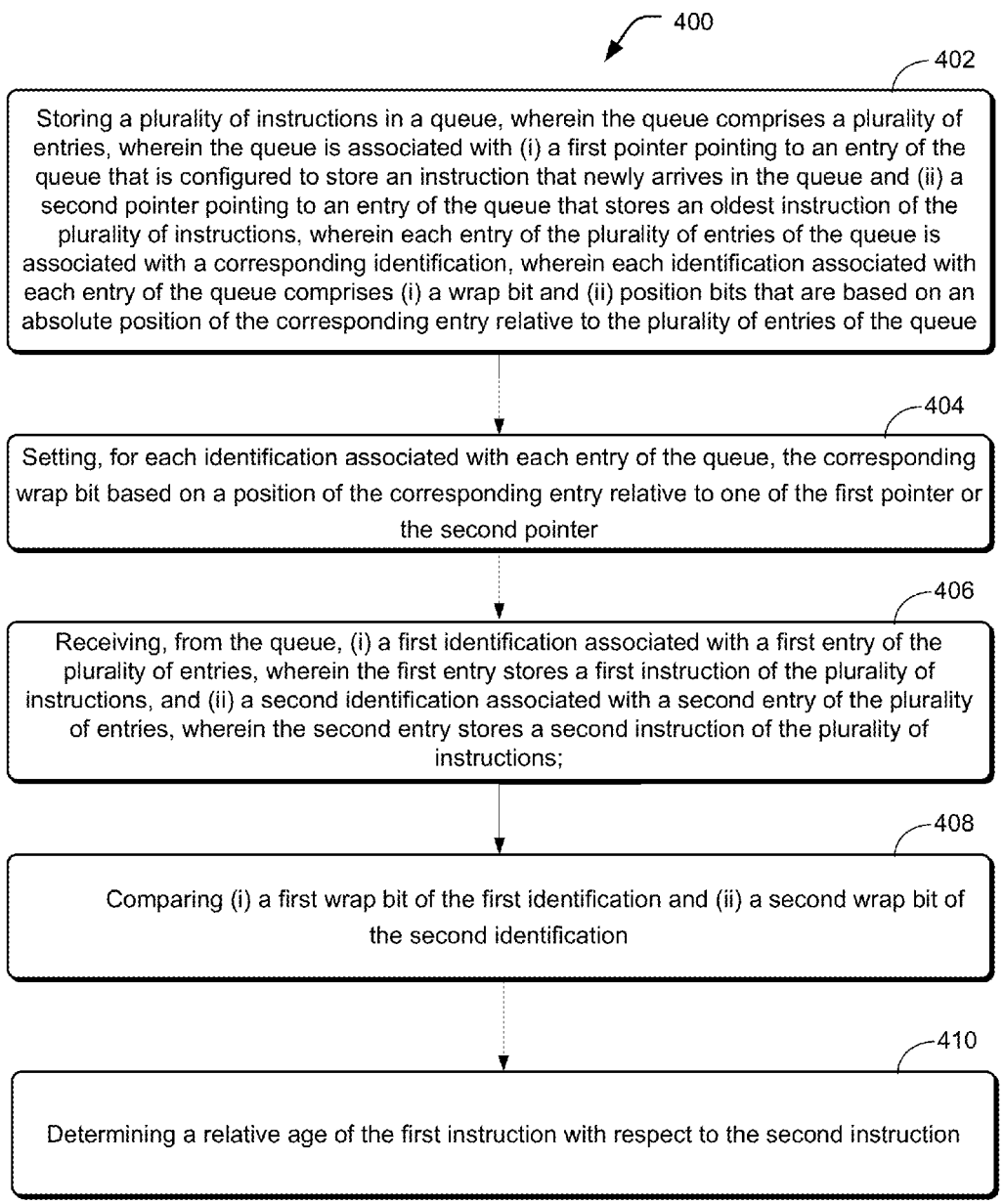
FIG. 4 illustrates an example method for operating the system of FIG. 1.

FIG. 4 illustrates an example method for operating the system of FIG. 1. At 402, a plurality of instructions is stored in a queue (e.g., queue 104), wherein the queue comprises a plurality of entries. In an embodiment, the queue is associated with (i) a first pointer (e.g., the put pointer 116) pointing to an entry of the queue that is configured to store an instruction that newly arrives in the queue and (ii) a second pointer (e.g., the take pointer 112) pointing to an entry of the queue that stores an oldest instruction of the plurality of instructions. In an embodiment, each entry of the plurality of entries of the queue is associated with a corresponding identification, wherein each identification associated with each entry of the queue comprises (i) a wrap bit and (ii) position bits that are based on an absolute position of the corresponding entry relative to the plurality of entries of the queue.

At 404, for each identification associated with each entry of the queue, the corresponding wrap bit is set based on a position of the corresponding entry relative to one of the first pointer or the second pointer (e.g., as illustrated in FIGS. 2A-2L). At 406, a processing unit (e.g., the processing unit 108 of FIG. 1) receives, from the queue, (i) a first identification associated with a first entry of the plurality of entries, wherein the first entry stores a first instruction of the plurality of instructions, and (ii) a second identification associated with a second entry of the plurality of entries, wherein the second entry stores a second instruction of the plurality of instructions. At 408, the processing unit compares (i) a first wrap bit of the first identification and (ii) a second wrap bit of the second identification. At 410, based on comparing (i) the first wrap bit of the first identification and (ii) the second wrap bit of the second identification, the processing unit determines a relative age of the first instruction with respect to the second instruction.

In accordance with various embodiments, an article of manufacture may be provided that includes a storage medium having instructions stored thereon that, if executed, result in the operations described herein with respect to the method 400 of FIG. 3 (and/or various other operations discussed in the present disclosure). In an embodiment, the storage medium comprises some type of non-transitory memory. In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A system comprising:
    a queue configured to store a plurality of instructions, wherein the queue comprises a plurality of entries, wherein the queue is associated with (i) a first pointer pointing to an entry of the queue that is configured to store an instruction that newly arrives in the queue and (ii) a second pointer pointing to an entry of the queue that stores an oldest instruction of the plurality of instructions, wherein each entry of the plurality of entries of the queue is associated with a corresponding identification, wherein each identification associated with each entry of the queue comprises (i) a wrap bit that is based on a position of the corresponding entry relative to one of the first pointer or the second pointer and (ii) position bits that are based on an absolute position of the corresponding entry relative to the plurality of entries of the queue; and
    a processing unit configured to
        receive, from the queue, (i) a first identification associated with a first entry of the plurality of entries, wherein the first entry stores a first instruction of the plurality of instructions, and (ii) a second identification associated with a second entry of the plurality of entries, wherein the second entry stores a second instruction of the plurality of instructions,
        compare (i) a first wrap bit of the first identification and (ii) a second wrap bit of the second identification, and
        based on comparing (i) the first wrap bit of the first identification and (ii) the second wrap bit of the second identification, determine a relative age of the first instruction with respect to the second instruction.

2. The system of claim 1, wherein the processing unit is further configured to:
    compare (i) first position bits of the first identification and (ii) second position bits of the second identification; and
    based on comparing (i) the first position bits of the first identification and (ii) the second position bits of the second identification, determine the relative age of the first instruction with respect to the second instruction.

3. The system of claim 2, wherein the processing unit is further configured to:
    in response to determining that (i) the first wrap bit of the first identification is the same as the second wrap bit of the second identification and (ii) the first position bits of the first identification is smaller than the second position bits of the second identification, determine that the first instruction is older than the second instruction, wherein the first instruction being older than the second instruction indicates that the first instruction entered the queue prior to the second instruction.

4. The system of claim 2, wherein the processing unit is further configured to:
    in response to determining that (i) the first wrap bit of the first identification is different from the second wrap bit of the second identification and (ii) the first position bits of the first identification is smaller than the second position bits of the second identification, determine that the first instruction is younger than the second instruction, wherein the first instruction being younger than the second instruction indicates that the first instruction entered the queue subsequent to the second instruction.

5. The system of claim 1, wherein the entry pointed to by the first pointer changes, in response to one or more instructions of the plurality of instructions being retired from the queue.

6. The system of claim 1, wherein:
the wrap bit of each identification associated with each entry of the queue is based on the position of the corresponding entry relative to the first pointer;
the plurality of entries of the queue is arranged sequentially in the queue;
the first pointer points to a third entry of the queue;
the first entry is located on a first side of the third entry;
the second entry is located on a second side of the third entry, wherein the second side is opposite to the first side; and
based on (i) the first entry being located on the first side of the third entry and (ii) the second entry being located on the second side of the third entry, the first wrap bit of the first identification is different from the second wrap bit of the second identification.

7. The system of claim 1, wherein:
the wrap bit of each identification associated with each entry of the queue is based on the position of the corresponding entry relative to the first pointer;
the plurality of entries of the queue is arranged sequentially in the queue;
the first pointer points to a third entry of the queue;
each of the first entry and the second is located on a first side of the third entry; and
based on each of the first entry and the second being located on the first side of the third entry, the first wrap bit of the first identification is same as the second wrap bit of the second identification.

8. The system of claim 1, wherein:
for each entry of the queue, the wrap bit changes with a movement of one of the first pointer or the second pointer; and
for each entry of the queue, the position bits are constant and do not change with the movement of one of the first pointer or the second pointer.

9. The system of claim 1, wherein:
the wrap bit of each identification associated with each entry of the queue is based on the position of the corresponding entry relative to the first pointer;
the plurality of entries of the queue is arranged sequentially in the queue;
during a first iteration, the first pointer moves from a start entry of the plurality of entries of the queue to an end entry of the plurality of entries of the queue;
during a second iteration that is subsequent to and different from the first iteration, the first pointer moves from the start entry of the plurality of entries of the queue to the end entry of the plurality of entries of the queue;
during the first iteration, the wrap bit of each entry of the queue storing a newly received instruction is set to a first value; and
during the second iteration, the wrap bit of each entry of the queue storing a newly received instruction is set to a second value that is different from the first value.

10. The system of claim 1, wherein the queue is a circular queue.

11. A method comprising:
storing a plurality of instructions in a queue, wherein the queue comprises a plurality of entries, wherein the queue is associated with (i) a first pointer pointing to an entry of the queue that is configured to store an instruction that newly arrives in the queue and (ii) a second pointer pointing to an entry of the queue that stores an oldest instruction of the plurality of instructions, wherein each entry of the plurality of entries of the queue is associated with a corresponding identification, wherein each identification associated with each entry of the queue comprises (i) a wrap bit and (ii) position bits that are based on an absolute position of the corresponding entry relative to the plurality of entries of the queue;
setting, for each identification associated with each entry of the queue, the corresponding wrap bit based on a position of the corresponding entry relative to one of the first pointer or the second pointer;
receiving, from the queue, (i) a first identification associated with a first entry of the plurality of entries, wherein the first entry stores a first instruction of the plurality of instructions, and (ii) a second identification associated with a second entry of the plurality of entries, wherein the second entry stores a second instruction of the plurality of instructions;
comparing (i) a first wrap bit of the first identification and (ii) a second wrap bit of the second identification; and
based on comparing (i) the first wrap bit of the first identification and (ii) the second wrap bit of the second identification, determining a relative age of the first instruction with respect to the second instruction.

12. The method of claim 11, further comprising:
comparing (i) first position bits of the first identification and (ii) second position bits of the second identification; and
based on comparing (i) the first position bits of the first identification and (ii) the second position bits of the second identification, determining the relative age of the first instruction with respect to the second instruction.

13. The method of claim 12, wherein determining the relative age of the first instruction with respect to the second instruction further comprises:
in response to determining that (i) the first wrap bit of the first identification is same as the second wrap bit of the second identification and (ii) the first position bits of the first identification is smaller than the second position bits of the second identification, determining that the first instruction is older than the second instruction, wherein the first instruction being older than the second instruction indicates that the first instruction entered the queue prior to the second instruction.

14. The method of claim 12, wherein determining the relative age of the first instruction with respect to the second instruction further comprises:
in response to determining that (i) the first wrap bit of the first identification is different from the second wrap bit of the second identification and (ii) the first position bits of the first identification is smaller than the second position bits of the second identification, determining that the first instruction is younger than the second instruction, wherein the first instruction being younger than the second instruction indicates that the first instruction entered the queue subsequent to the second instruction.

15. The method of claim 11, wherein the entry pointed to by the first pointer changes, in response to one or more instructions of the plurality of instructions being retired from the queue.

16. The method of claim 11, wherein:
the wrap bit of each identification associated with each entry of the queue is based on the position of the corresponding entry relative to the first pointer;

the plurality of entries of the queue is arranged sequentially in the queue;
the first pointer points to a third entry of the queue;
the first entry is located on a first side of the third entry;
the second entry is located on a second side of the third entry, wherein the second side is opposite to the first side; and
setting, for each identification associated with each entry of the queue, the corresponding wrap bit further comprises based on (i) the first entry being located on the first side of the third entry and (ii) the second entry being located on the second side of the third entry, setting the first wrap bit of the first identification to be different from the second wrap bit of the second identification.

17. The method of claim 11, wherein:
the wrap bit of each identification associated with each entry of the queue is based on the position of the corresponding entry relative to the first pointer;
the plurality of entries of the queue is arranged sequentially in the queue;
the first pointer points to a third entry of the queue;
each of the first entry and the second is located on a first side of the third entry; and
setting, for each identification associated with each entry of the queue, the corresponding wrap bit further comprises based on each of the first entry and the second being located on the first side of the third entry, setting the first wrap bit of the first identification to be same as the second wrap bit of the second identification.

18. The method of claim 11, wherein:
for each entry of the queue, the wrap bit changes with a movement of one of the first pointer or the second pointer; and
for each entry of the queue, the position bits are constant and do not change with the movement of one of the first pointer or the second pointer.

19. The method of claim 11, wherein:
the wrap bit of each identification associated with each entry of the queue is based on the position of the corresponding entry relative to the first pointer;
the plurality of entries of the queue is arranged sequentially in the queue;
during a first iteration, the first pointer moves from a start entry of the plurality of entries of the queue to an end entry of the plurality of entries of the queue;
during a second iteration that is subsequent to and different from the first iteration, the first pointer moves from the start entry of the plurality of entries of the queue to the end entry of the plurality of entries of the queue; and
setting, for each identification associated with each entry of the queue, the corresponding wrap bit further comprises
during the first iteration, setting the wrap bit of each entry of the queue storing a newly received instruction to a first value, and
during the second iteration, setting the wrap bit of each entry of the queue storing a newly received instruction to a second value that is different from the first value.

20. The method of claim 11, wherein the queue is a circular queue.

* * * * *